(12) United States Patent
Posner et al.

(10) Patent No.: US 7,069,366 B2
(45) Date of Patent: Jun. 27, 2006

(54) SYSTEM AND METHOD FOR HANDLING RESOURCE TRANSACTION REQUESTS

(75) Inventors: Sarah Posner, Toronto (CA); Miroslaw A. Flasza, Toronto (CA); Jeffrey J. Goss, Toronto (CA); Matthew A. Huras, Ajax (CA); Catherine S. McArthur, Uxbridge (CA); Lorysa M. Meadowcroft, Toronto (CA); Michael J. Winer, Markham (CA); Roger L. Q. Zheng, Scarborough (CA)

(73) Assignee: International Business Machines Corporation, Armonk, NY (US)

(*) Notice: Subject to any disclaimer, the term of this patent is extended or adjusted under 35 U.S.C. 154(b) by 328 days.

(21) Appl. No.: 10/346,214

(22) Filed: Jan. 18, 2003

(65) Prior Publication Data

US 2003/0145146 A1    Jul. 31, 2003

(30) Foreign Application Priority Data

Jan. 25, 2002    (CA)    ................................... 2369621

(51) Int. Cl.
*G06F 12/00* (2006.01)
(52) U.S. Cl. ..................................... 710/200
(58) Field of Classification Search ................. 710/200
See application file for complete search history.

(56) References Cited

U.S. PATENT DOCUMENTS

| | | | |
|---|---|---|---|
| 5,280,612 A | 1/1994 | Lorie et al. | 395/600 |
| 5,283,897 A | 2/1994 | Georgiadis et al. | 395/650 |
| 5,657,474 A | 8/1997 | Paul Dubois Taine et al. | 395/490 |
| 5,734,909 A * | 3/1998 | Bennett | 710/200 |
| 6,052,731 A * | 4/2000 | Holdsworth et al. | 709/229 |
| 6,076,126 A | 6/2000 | Shagam | 710/108 |
| 6,088,757 A * | 7/2000 | Boonie et al. | 710/200 |
| 6,141,715 A | 10/2000 | Porterfield | 710/113 |
| 6,182,186 B1 * | 1/2001 | Daynes | 710/200 |
| 6,185,650 B1 * | 2/2001 | Boonie et al. | 710/200 |
| 6,292,705 B1 | 9/2001 | Wang et al. | 700/5 |
| 6,412,034 B1 * | 6/2002 | Chan | 710/200 |
| 6,691,194 B1 * | 2/2004 | Ofer | 710/200 |

FOREIGN PATENT DOCUMENTS

| | | |
|---|---|---|
| JP | 10027122 A2 | 1/1998 |
| JP | 11025191 A2 | 1/1999 |

OTHER PUBLICATIONS

Mark Moir, "Transparent Support for Wait-Free Transactions," Department of Computer Science, The University of Pittsburgh, PA 15260, 1997.

(Continued)

*Primary Examiner*—Rehana Perveen
*Assistant Examiner*—Christopher Daley
(74) *Attorney, Agent, or Firm*—Samuel A. Kassatly (57) ABSTRACT

A system and method handle resource transaction requests. The system marks a waiting transaction request, having an access mode which is incompatible with the access mode of the executing transaction, with an ignore bit, so that a transaction request with an access mode compatible with the access mode of the executing transaction may receive a lock in order to access the resource. The transaction request is then marked with a bypass indicator such that when the executing transactions are finished accessing the resource, the waiting transaction request may be notified that it may have access to the resource. The system includes the ignore bit so that each transaction request that arrives after the ignore bit has been set, does not suffer from a long waiting time before being provided access to the resource.

19 Claims, 7 Drawing Sheets

OTHER PUBLICATIONS

N. Memoto et al.. "Quality-Based Approach to Locking Multimedia Objects," Proceedings—21st International Conference on Distributed Computing Systems Workshops, pp. 351-356, Apr. 16-19, 2001, Mesa Arizona.

* cited by examiner

SYSTEM AND METHOD FOR HANDLING RESOURCE TRANSACTION REQUESTS

PRIORITY CLAIM

The present application claims the priority of Canadian Patent Application Serial No. 2,369,621, titled "Method and Apparatus for Handling Resource Transaction Requests," filed on Jan. 25, 2002, which is incorporated herein by reference in its entirety.

FIELD OF THE INVENTION

The present invention relates in general to the field of resource manipulation, and more specifically to a method and apparatus for handling resource transaction requests.

BACKGROUND OF THE INVENTION

In the field of database technology, resources, generally in the form of a row within a table, are accessed to be written to or read from. In most cases, the resource is individually accessed by queued transactions which are arranged in a First-In-First-Out (FIFO) manner. At any time, the resource may be accessed by multiple transactions which have concurrently requested access to the resource provided the transactions have compatible access modes.

To maintain the integrity of the resource being accessed, as well as to prevent other non-compatible transactions from accessing the resource, a locking protocol is maintained. Furthermore, any existing transaction requests have a requirement that new transaction requests should be aware that the existing transaction requests are currently stored in the database. All new transaction requests should be made aware that there are existing transaction requests.

Moreover, the new transaction requests have to wait for the existing transaction requests to finish executing. Each of the transaction requests contains information corresponding to a lock request as along with other relevant information.

Locking refers to the device associated with a transaction request having access to the resource. Therefore, when a transaction has a lock, it has been granted access to the resource. If a transaction request requests the lock but has an access mode (share, exclusive, etc.) that is not compatible with the access modes of the transactions holding the lock (executing transactions), it is forced to wait. In this case, the lock request is created for the transaction request and added to the end of a list of transactions (which includes those that have a hold on the lock and those waiting to be granted). The transaction request contains all the information pertaining to this lock request.

When a transaction request that has been granted the lock (access to the resource) has executed, the transaction request releases its hold on the lock. The list of transactions is reassessed and the next transaction waiting in line may be granted the lock if its access mode is compatible with the other executing transactions.

This reassessment continues down the list until an access mode, which is not compatible with the executing transactions is found. If there is a transaction further down the list that is compatible with the access mode of the executing transactions, it will have to wait until the transactions before it have been granted the lock. As discussed earlier, this causes the data transactions to be handled in a FIFO order.

It is important to maintain the FIFO order to prevent starvation. Starvation occurs when a transaction has to continuously wait for and is never granted the lock (access to the resource) since it allows other transactions with different access modes to pass it.

For example, if a row in a table is to be updated while there is a transaction reading from the row, the update may not take place until all the transaction requests currently accessing the resource have finished executing. To address this problem, presently, an instant lock request having an access mode, preferably a strong access mode, that conflicts with access modes of the executing transactions is sent. By using a strong access mode, the subsequent transaction request enters a converting state and the subsequent transaction request is granted the lock when all current transactions have released their lock on the resource. However, by using the strong access mode new scanners are prevented from reading from the table. This can cause major performance problems as no other work can be done on this table while waiting for the scanners to complete reading.

What is therefore needed is a system and associated method for obviating or mitigating the foregoing problem.

SUMMARY OF THE INVENTION

In general terms, the present invention is directed to a method and apparatus for handling resource transaction requests. By marking a waiting transaction request, having an access mode which is incompatible with the access mode of the executing transaction(s), with an ignore bit, a transaction request with an access mode compatible with the access mode(s) of the executing transaction(s) may receive a lock in order to access the resource. The transaction request is then marked with a bypass indicator such that when the executing transactions are finished accessing the resource, the waiting transaction request may be notified that it may have access to the resource. By including the ignore bit, each transaction request that arrives after the ignore bit has been set, does not suffer from a long waiting time before being provided access to the resource.

In this manner, a transaction request does not have to wait until all of the previous transactions have accessed the resource before receiving the lock provided it has an access mode that is compatible with the access mode of executing transactions.

Moreover, transactions accessing the resource may be differentiated so that starvation does not occur for other waiting transaction requests.

FIFO ordering is maintained but special cases are handled differently on a case-by-case basis.

In one aspect of the present invention, there is provided a method of handling a lock request from a requesting transaction request for access to a resource executing at least one prior transaction request, comprising the steps of receiving the lock request from the requesting transaction request; determining if a conflict exists between an access mode of the requesting transaction request and an access mode of each of the executing transaction requests; if the conflict exists, determining if any prior transaction request has been refused and is currently waiting for access to the resource; if the any prior transaction request is not waiting, granting an ignore indicator to the requesting transaction request; wherein the ignore indicator allows a subsequent transaction request to be granted access to the resource if an access mode of the subsequent transaction request does not conflict with the access modes of each of the executing transaction requests.

In another aspect of the present invention, there is provided an apparatus for handling a lock request from a requesting transaction request for access to a resource executing at least one prior transaction request comprising a lock manager for receiving the lock request and for comparing an access mode of the requesting transaction request with access modes of each of the executing transaction requests; and a requestor for granting an ignore indicator to the requesting transaction request if a conflict exists and wherein no prior transaction request is waiting; wherein the ignore indicator allows a subsequent transaction request to be granted access to the resource if an access mode of the subsequent transaction request does not conflict with the access modes of each of the executing transaction requests.

In yet another aspect, there is a provided in a database comprising a lock manager for receiving a lock request and for comparing an access mode of a requesting transaction request with access modes of executing transaction requests and a requestor for granting an ignore indicator to the requesting transaction request if a conflict exists and wherein no prior transaction request is waiting, a method for handling the lock request from the requesting transaction request for access to a resource executing at least one prior transaction request comprising the steps of receiving the lock request from the requesting transaction request; determining if the conflict exists between an access mode of the requesting transaction request and an access mode of each of the executing transaction requests; if the conflict exists, determining if any prior transaction request has been refused and is currently waiting for access to the resource; if the any prior transaction request is not waiting, granting the ignore indicator to the requesting transaction request; wherein the ignore indicator allows a subsequent transaction request to be granted access to the resource if an access mode of the subsequent transaction request does not conflict with the access modes of each of the executing transaction requests.

BRIEF DESCRIPTION OF THE DRAWINGS

These and other features of the preferred embodiments of the invention will become more apparent in the following detailed description in which reference is made to the appended drawings wherein.

DETAILED DESCRIPTION OF PREFERRED EMBODIMENTS

Figure 1:
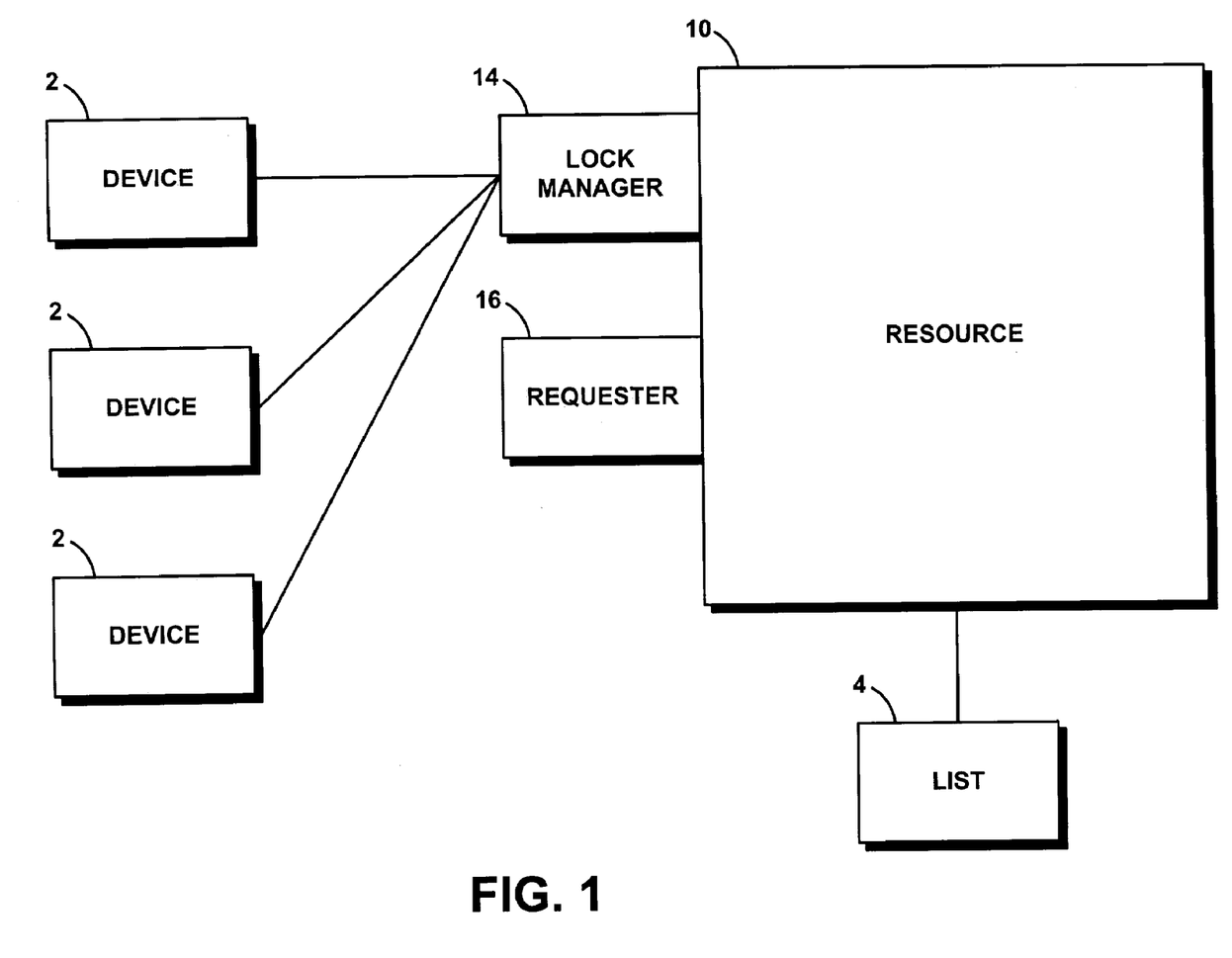
FIG. 1 is a schematic diagram of devices accessing a resource.

Turning to FIG. 1, devices 2, such as processors or scanners send transaction requests to a lock manager 14 associated with a resource 10 they wish to access. As used herein, a transaction request may include a lock request. The transaction requests are stored in a list 4 to keep track of all the transaction requests received by the lock manager 14. Although only three devices 2 are shown, it should be understood that any number of devices 2 may send transaction requests to the lock manager 14. A requester 16 sets an overall ignore indicator, such as an overall ignore bit, as well as individual ignore indicators, such as an ignore indicator bits.

Figure 2:
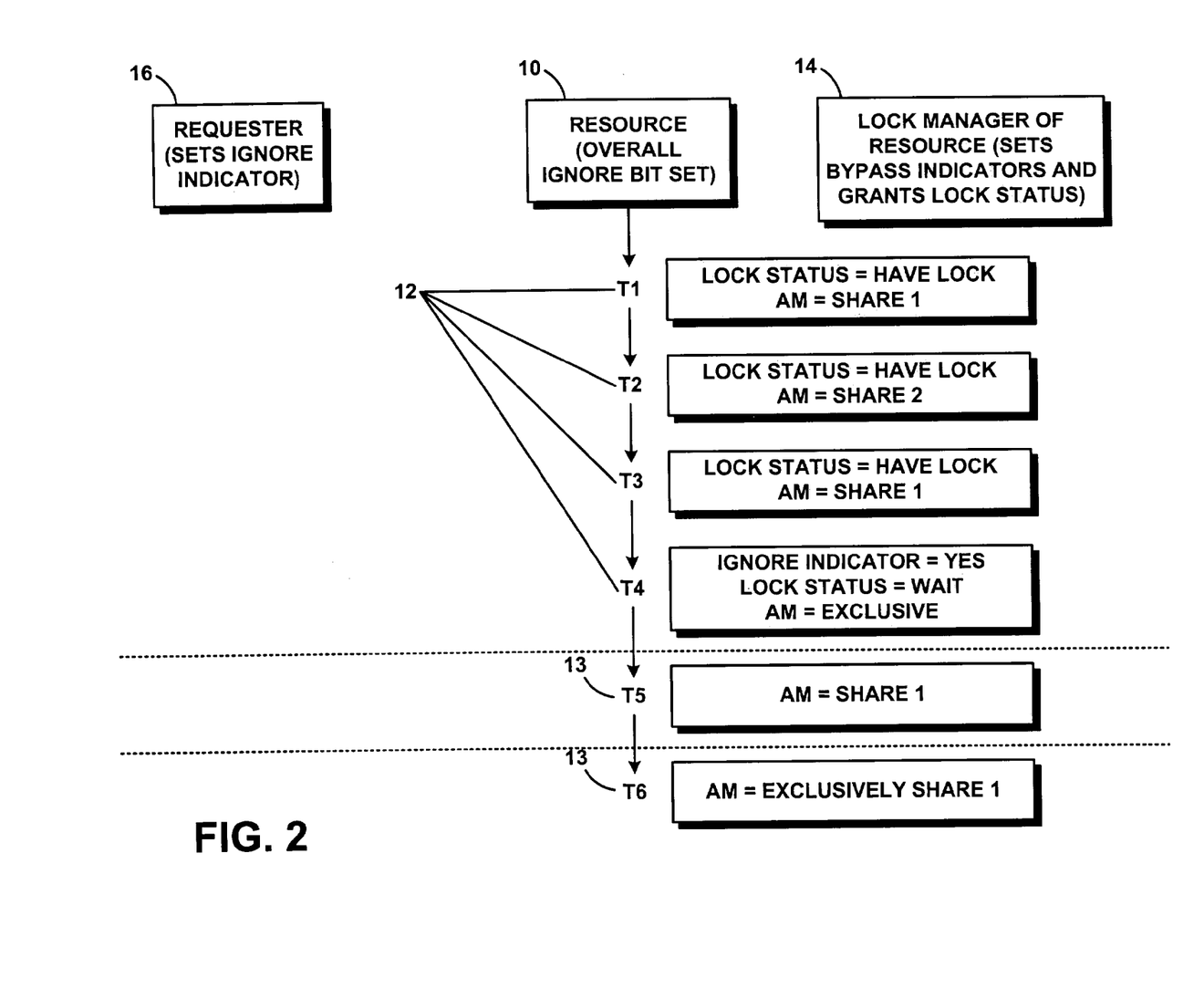
FIG. 2 is a first example of a schematic diagram of transaction requests.

Turning to FIG. 2, the resource 10 generally has several existing or prior transaction requests 12. These transaction requests 12 are stored in the list 4 of FIG. 1, in order to monitor access of devices to the resource 10. It will be understood that the resource 10 is preferably a row of information within a table.

The transaction requests 12 request access to the resource in order for their associated devices to perform certain instructions such as updates, reads or writes on the resource. As an illustration, the resource 10 of FIG. 2 presently has four existing transaction requests 12, T1, T2, T3, and T4. Any new, or requesting, transaction requests 13 are forwarded to, and monitored by the lock manager 14 to determine if these new requests 13 are compatible with existing transaction requests, such as executing or waiting.

Each of the requests 12 and 13 has a number of settable parameters including a lock status, an access mode, an ignore bit indicator and a bypass indicator. The lock status indicates whether or not the transaction request presently has access to the resource. Each transaction request may have either a "Have Lock" lock status (access to the resource) or a "Waiting" lock state (waiting for access to the resource). The boxes beside each of the existing transaction requests indicate the lock status of the transaction requests along with any other relevant information.

The access mode (AM) of the transaction request refers to the nature of the transaction or the manner in which the device associated with the transaction request accesses the resource 10. In some cases, the transaction request may require sole access (AM equals Exclusive) to the resource and sometimes the transaction request may access the resource while other transaction requests are accessing the resource (AM equals Share). It will be understood that there are other access modes which are combinations of the Share and Exclusive access modes whereby access to the resource 10 may be possible for some other transaction request but restricted to some. Therefore, transactions with similar access modes may be executed in a parallel manner. Transactions such as updating the resource 10, are required to be executed serially.

The ignore bit indicator is set when the access mode of the first new transaction request is not compatible with the access modes of current transaction requests being executed. The ignore bit indicator is set to indicate that although there exists a waiting transaction request (the first new transaction request), a subsequent transaction request with a compatible access mode to executing transactions may bypass the waiting transaction request to access the resource.

In order to keep track of which transaction requests arrive after the ignore bit indicator has been set, a flag, such as the bypass indicator, is set on all transaction requests that arrive after the ignore bit indicator has been set. It will be understood that other information may be associated with the transaction requests but since they are not necessary for consideration of the present embodiment, they are not listed. Furthermore, since the type of transaction request does not affect the overall operation, each of the transaction requests is denoted with the letter T.

In order for the transaction requests to be implemented, the transaction requests are granted a lock status of "Have Lock" from the lock manager 14. The lock manager 14 is also used to set the bypass indicators, where necessary. The requestor 16 sets the ignore bit indicator, where necessary, and an overall ignore bit.

In the present example request, T1 has an AM of Share1 and has been granted a lock status of Have Lock while T2 has an AM of Share2 and a lock status of Have Lock. T3 has an AM of Share1 and a lock status of Have Lock and T4 has an access mode of Exclusive and a lock status of Waiting. These values are arbitrarily set for this example only. It will be understood that there are many different types of access modes and the ones selected are directed at more clearly defining the type of access mode. Furthermore, the ignore bit indicator for T4 has been set along with the overall ignore bit by the requestor 16, which signifies that any new transaction request 13 that arrives after T4 and that has only an access mode conflict with T4 may be granted the Have Lock lock status prior to the execution of T4. This will be explained in more detail below.

Therefore, when a new, or requesting, transaction request 13, such as T5, with an AM of Share1, arrives and requests a lock status of Have Lock to access the resource 10, the lock manager 14 compares the access mode of T5 with the access modes of the existing transaction requests 12. This is more fully described below.

A second new transaction request T6 is also shown with an AM of ExclusivelyShare1. For this example, this AM provides that T6 has an exclusive aspect to its transaction but may be operable in parallel with some other transactions provided the access modes of the other transactions are compatible. As discussed above, there are many variations on the AM of transaction requests.

Figure 3A:
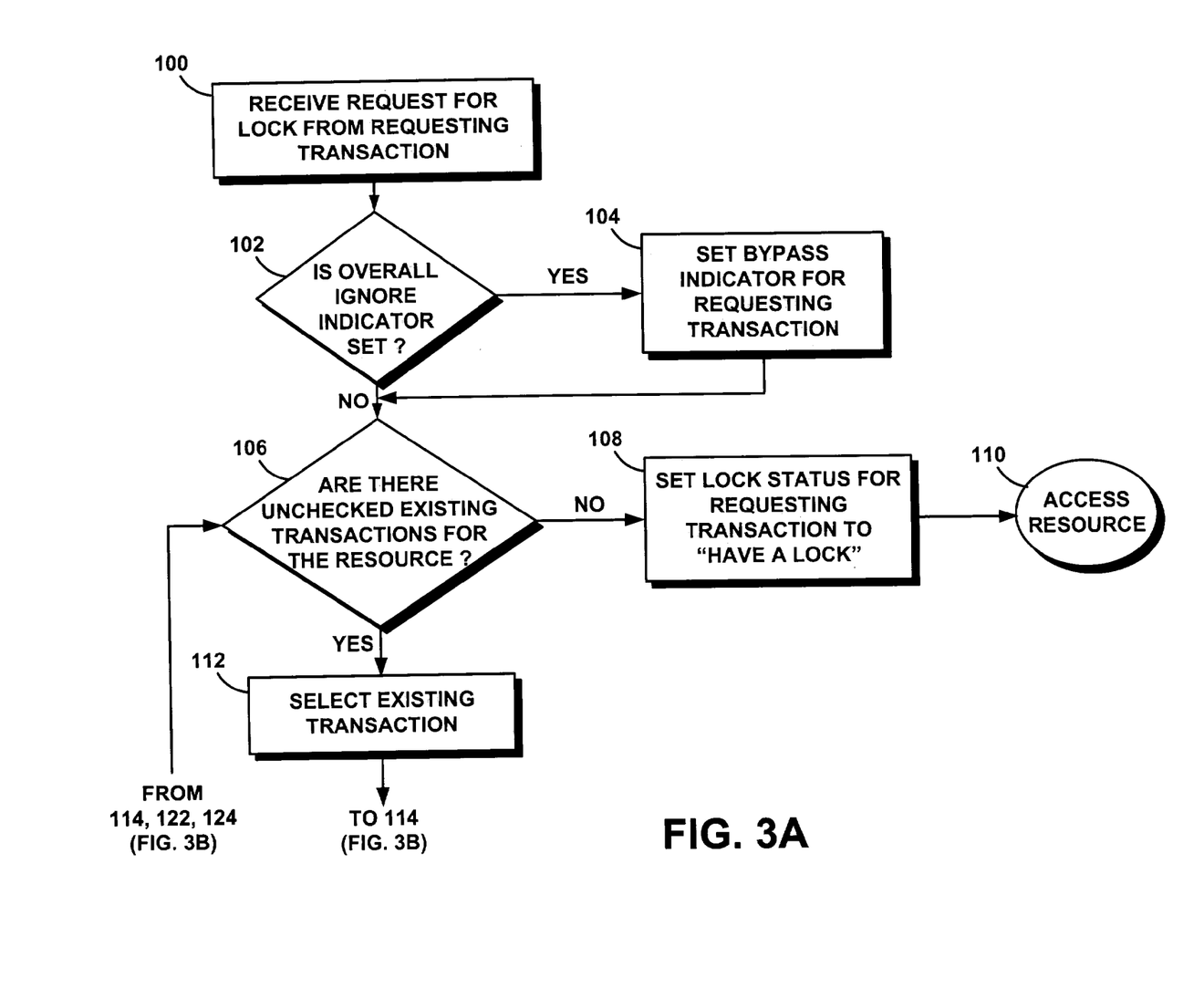
FIG. 3 is comprised of FIGS. 3A and 3B, and represents a process flowchart that illustrates the process of handling transaction requests.
Figure 3B:
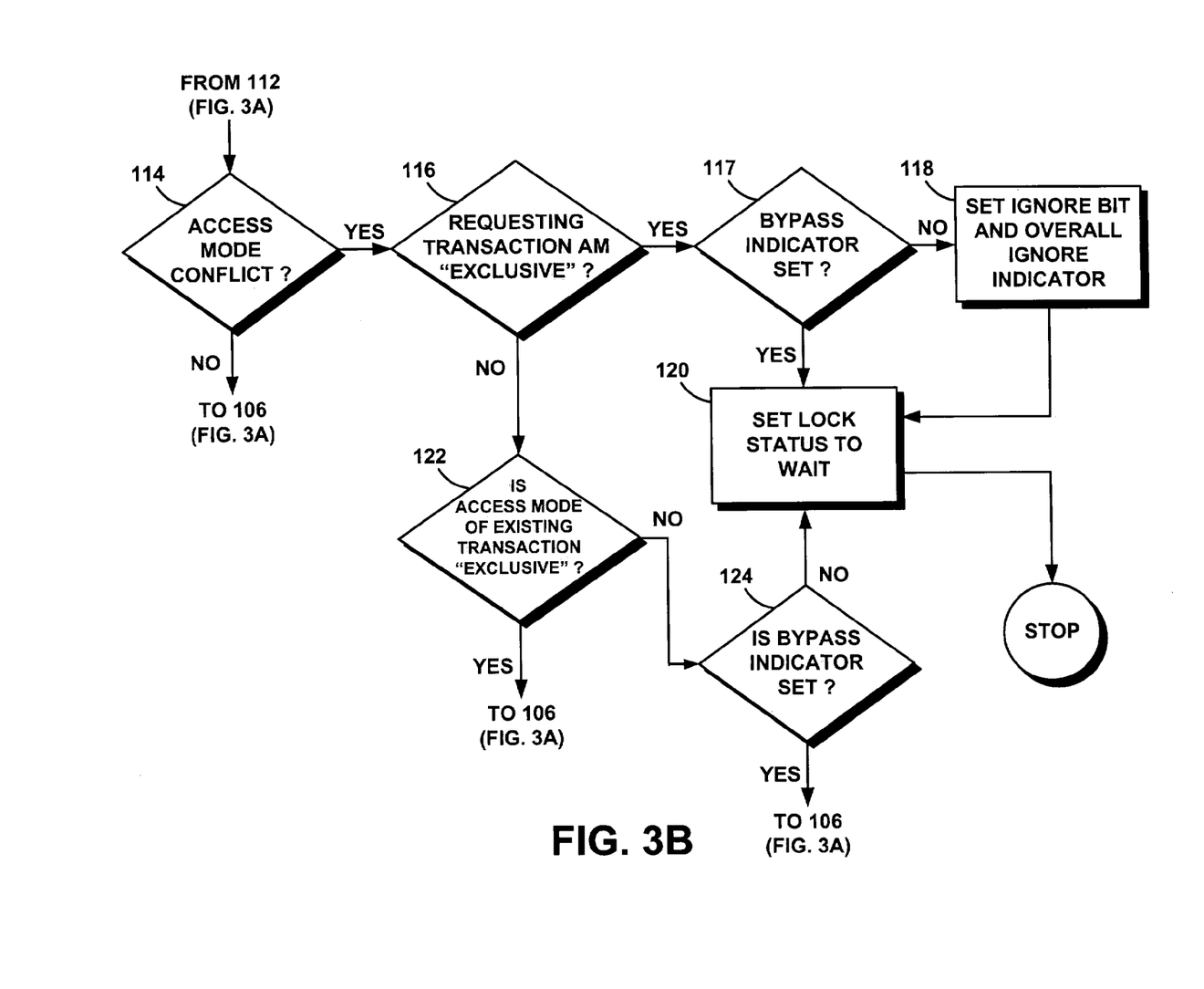

As illustrated in FIG. 3 (FIGS. 3A, 3B), a new, or requesting, transaction request 13 for access to the resource 10 (a request to receive a lock status of Have Lock) from a device 2 is sent to, and received by the lock manager 14 (step 100). After the new transaction request 13 has been received by the lock manager 14, a check is performed to verify whether or not the overall ignore bit has been set (decision step 102).

If it is determined at decision step 102 that the overall ignore bit is set, the lock manager 14 then sets a bypass indicator bit for the requesting transaction request (step 104) to signify that the requesting transaction request arrived after the overall ignore bit had been set. The lock manager 14 then checks to determine if there are any existing, including executing (lock status equals Have Lock) and waiting (lock status equals waiting), transaction requests for the resource 10 (step 106).

If the overall ignore bit has not been set, the lock manager 14 proceeds to check if there are any existing transaction requests for the resource 10 (step 106).

If there are no existing transaction requests for the resource, the lock status of the requesting transaction request 13 is set to Have Lock (step 108) and the device 2 associated with the requesting transaction request 13 may access the resource 10 (step 110). On the other hand, if there is at least one existing transaction request 12, further checks are performed in order for the lock manager 14 to assign a lock status for the requesting transaction request 13.

The list 4 of existing transaction requests 12, along with their access modes, corresponding to the resource 10, are stored in a database for comparison with the requesting transaction request 13. The existing transaction requests 12 are processed in order from top to bottom so that a check against each existing transaction request 12 is performed only once for each requesting transaction request 13. Therefore, the first existing transaction request is selected from the list (step 112).

After an existing transaction request has been selected, a check is performed to determine whether or not there exists an access mode conflict between the requesting transaction request 13 and the existing transaction request 12 (step 114).

A conflict arises when the access modes of the two transaction requests are not compatible.

If it is determined at decision step 114 that no access mode conflict exists, the lock manager 14 proceeds to decision step 106, and checks if there are any other existing transaction requests 12 in the list for the resource 10 against which the requesting transaction request 13 has to be checked. As it will be understood, this information is retrievable from the list 4.

If it is determined at decision step 106 that there are additional existing transaction requests, the next existing transaction request is selected (step 112) and a similar check performed. This inquiry is repeated until there are no further existing transaction requests in the list 4, in which event, the requesting transaction request is granted a lock status of Have Lock (step 108).

If it is determined at decision step 114 that there exists an access mode conflict between the requesting transaction request 13 and the selected existing transaction request 12, further checks are performed. A first check is performed to determine if the requesting transaction request 13 requires sole access to the resource 10 (such as an access mode of Exclusive), at decision step 116. This means that the requesting transaction request is unable to access the resource until all of the existing waiting transaction requests finish accessing the resource 10.

If the requesting transaction request 13 is of this type, the lock manager 14 checks to determine if the bypass indicator for the requesting transaction request 13 has been set (step 117). If the bypass indicator is not set, the requester 16 grants an ignore bit indicator to the requesting transaction request and sets the overall ignore bit (step 118) so that any subsequent requesting transaction requests are set with the bypass indicator.

The lock status of the requesting transaction request 13 is then set to Wait (or Waiting) at step 120. If the bypass indicator has previously been set, the lock status of the requesting transaction request is set to Waiting (step 120). The requesting transaction request 13 then waits until its lock status is changed to Have Lock before accessing the resource 10 as will be explained more fully with reference to FIG. 3 below.

On the other hand, if the requesting transaction request 13 is not of the type that requires sole access to the resource 10, a check is performed to determine if the selected existing transaction request 12 is of the type that requires sole access to the resource 10 (step 122). If the existing transaction request is of this type, the lock manager 14 checks if there are any additional existing transaction requests 12 (step 106). As described earlier, if there are no other existing transaction requests 12, the requesting transaction request 13 is granted a lock status of Have Lock (step 108). If there is at least one more existing transaction requests, the existing transaction request is selected (step 112) and similar checks are performed as described above.

If at step 124 it is determined that the existing transaction request 12 is not of the exclusive type, a check is performed to determine if the bypass indicator of the requesting transaction request is set (step 124). If the bit is set, the lock manager 14 returns to check if there are any more existing transaction requests in the list 4 (step 106). If the bypass indicator is not set, then the lock status of the requesting transaction request 13 is set to Waiting (step 120). Therefore, when the requesting transaction request 13 is checked against the list 4 of existing transaction request, it will either be granted a lock status of Have Lock or Waiting.

Figure 4A:
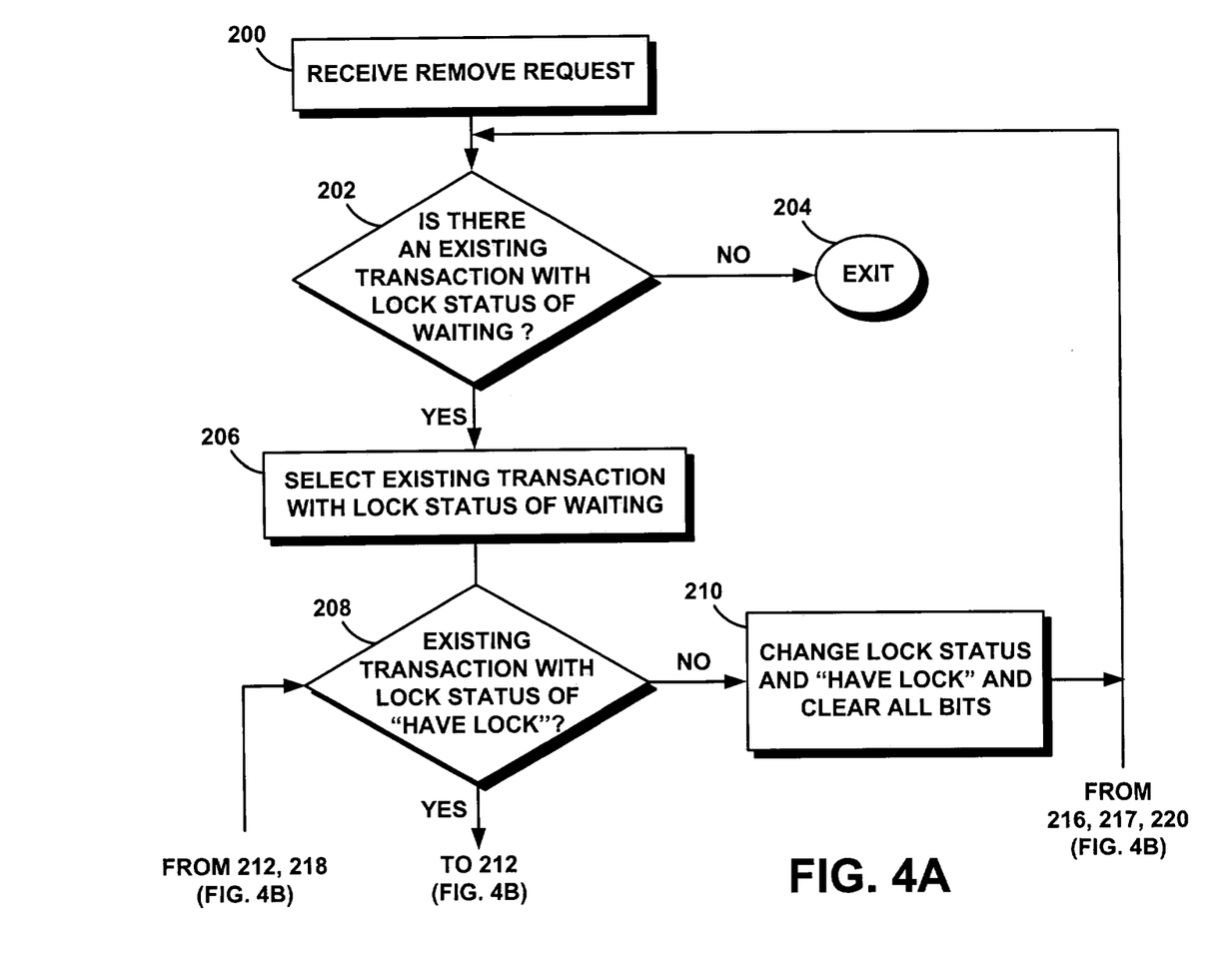
FIG. 4 is comprised of FIGS. 4A, 4B, and represents a process flowchart that illustrates the process of removing a transaction request.
Figure 4B:
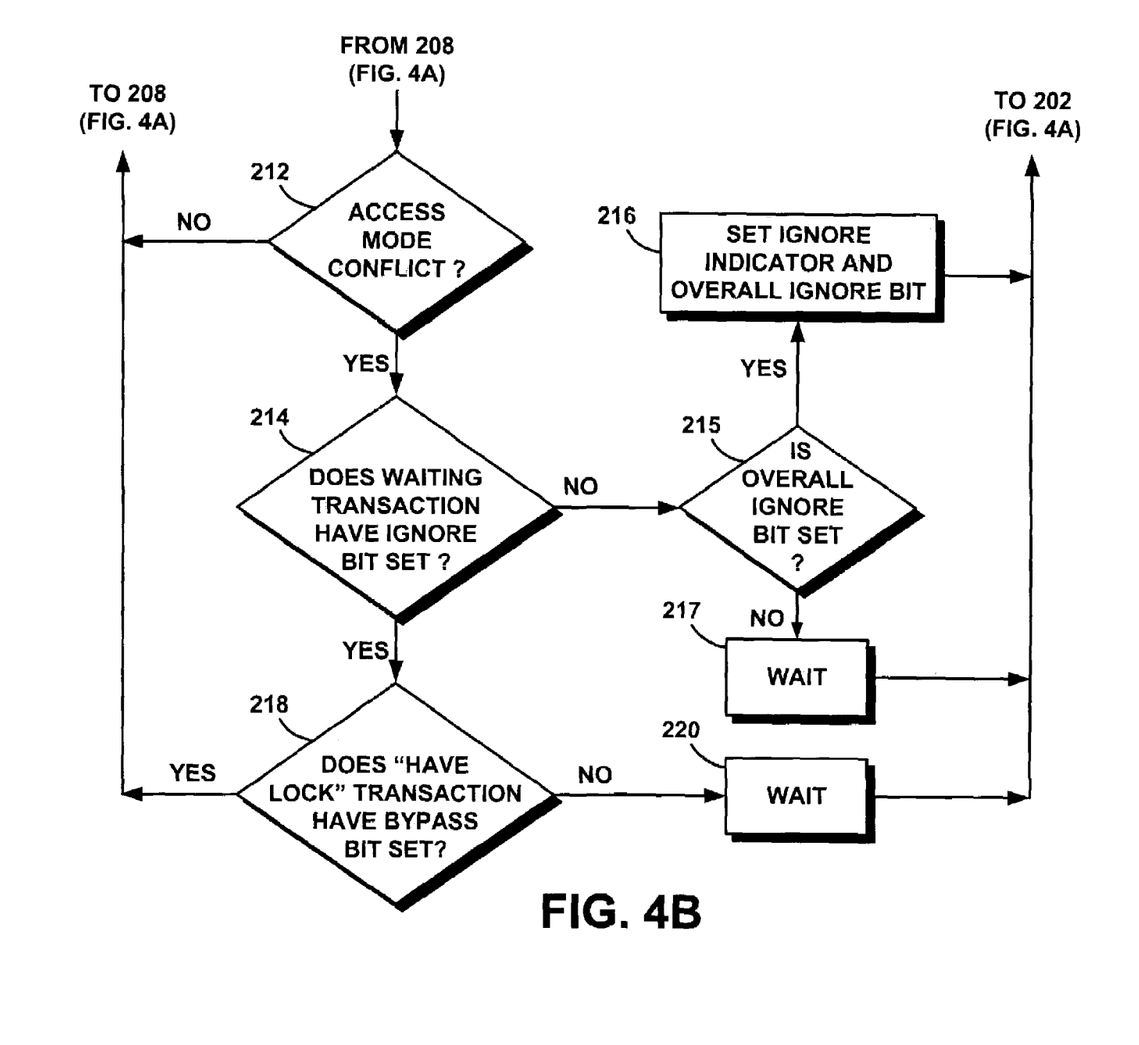
Figure 5:
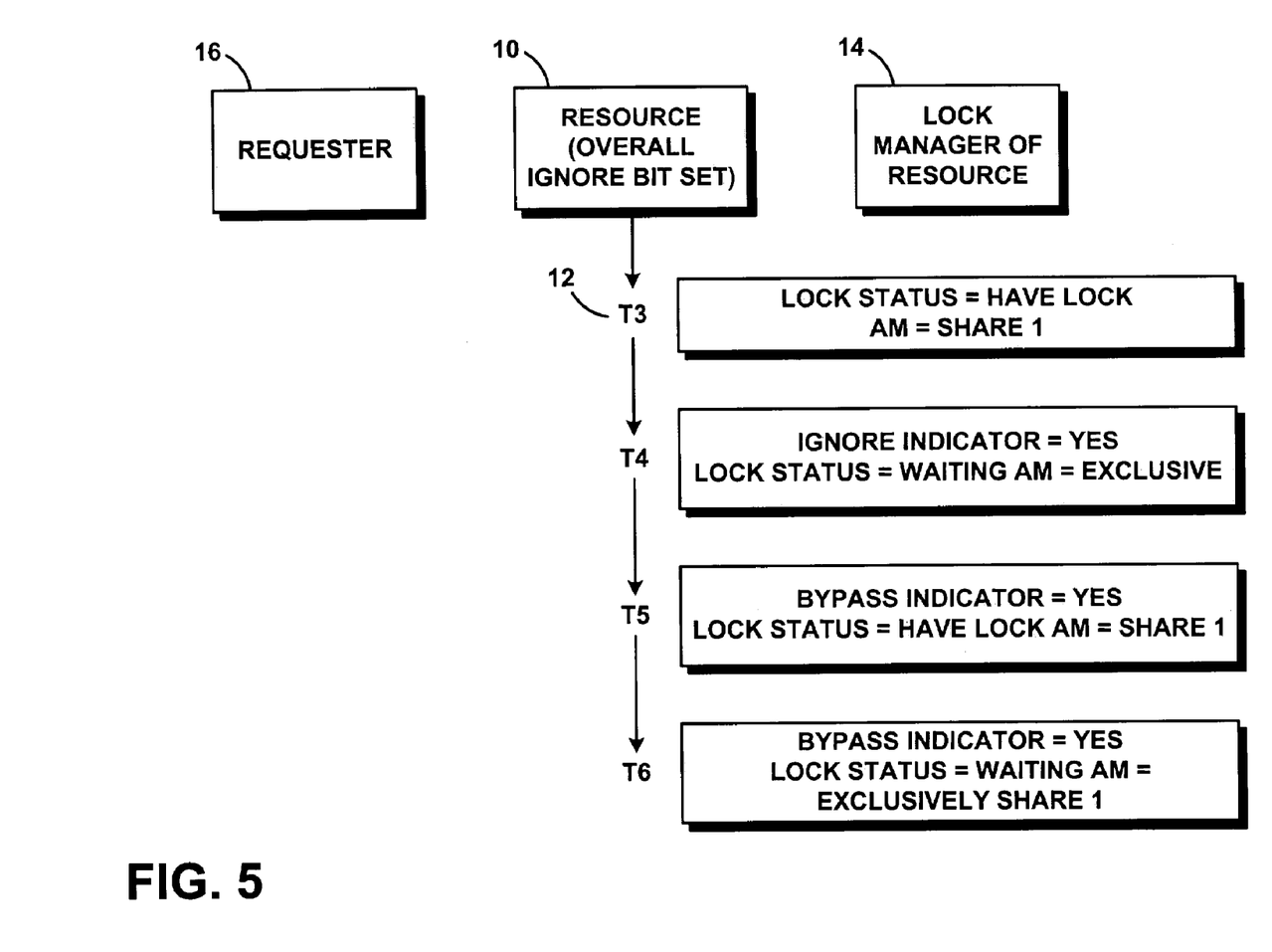
FIG. 5 is a schematic diagram illustrating another transaction request.

Turning now to FIG. 4 (FIGS. 4A, 4B), it illustrates a flowchart outlining an embodiment of how lock statuses of existing transaction requests 12 are updated once a device 2 has finished accessing the resource 10. A remove request is received from the device 2 associated with the transaction request that has just finished accessing the resource 10 (step 200).

The lock manager 14 then establishes whether or not there are any existing transaction requests 12 with a lock status of Waiting in the list (step 202). If not, the lock manger 14 exits (step 204) and simply waits for another transaction request to request a lock for the resource 10. If there is a transaction request, the lock manager 14 selects the first existing transaction request with a lock status of Waiting from the list 4 (step 206).

The lock manager 14 then checks the list to determine if there are any existing transaction requests 12 with the lock status of Have Lock (step 208). If there are none, then the lock status of the selected existing transaction request 12 is changed from Waiting to Have Lock and all the bits (i.e., overall ignore bit, bypass indicator and ignore bit indicator), for all the transaction requests, are cleared (step 210).

The lock manager 14 then returns to the list 4 to determine if there are any more existing transaction requests 12 with a lock status of Waiting (step 202). It will be understood that two existing transaction requests with lock statuses of Waiting will not need to be compared because the second waiting transaction request may not access the resource until the first waiting transaction request receives access to the resource 10. When this occurs, the access mode of the second waiting transaction request will be compared with the access mode of the newest executing transaction request. This will be more fully described below.

If it is determined at decision step 208 that there exists an existing transaction request with a lock status of Have Lock, a subsequent check is performed at decision step 212, to determine if the selected Waiting transaction request has an access mode conflict with the selected transaction request with the lock status of Have Lock.

If it is determined at decision step 212 that no such access mode conflict exists, the lock manager 14 returns to the list 4 to determine if there are any more existing transaction requests with a lock status of Have Lock that have not been compared with the selected existing waiting transaction request (step 208). If however, it is determined at decision step 212 that an access mode conflict exists, a check is performed to verify whether or not the selected existing transaction request with the lock status of Waiting has its ignore bit indicator set (step 214).

If the ignore bit indicator is not set, a check is performed to determine if the overall ignore bit is set (step 215). If the overall ignore bit is set, the requestor 16 sets the ignore bit indicator of the existing transaction request with the lock status of Waiting along with the overall ignore bit (step 216). If the overall ignore bit is not set, the lock status of the selected existing transaction request with the lock status of Waiting remains the same (step 217) and the lock manager 14 goes back to the list 4 to determine if there are any more existing transaction requests with the lock status of Waiting which have yet to be checked (step 202).

However, if the ignore bit indicator in the existing waiting transaction request is set, a check is performed to determine if the selected existing transaction request with the lock status of Have Lock has had its bypass indicator set (step 218). If not, the lock status of the selected existing transaction request with the lock status of Waiting stays the same (step 220) and the lock manager 14 goes back to the list 4 to determine if there are any more existing transaction requests with the lock status of Waiting which have yet to be checked (step 202).

However, if the bypass indicator has been set, the lock manager 14 returns to the list 4 to verify whether or not there are other existing transaction requests with the lock status of Have Lock which are required to be checked against the selected existing transaction request with the lock status of Waiting. This continues until the existing transaction request with the lock status of Waiting has been compared with all of the existing transaction requests with the lock status of Have Lock. After this, the existing transaction request with the lock status of Waiting will either have its lock status changed to Have Lock or retains the same lock status of Waiting.

A more detailed example will now be described in connection with FIG. 2. As described earlier, transaction requests T1, T2, and T3 have been granted a lock status of Have Lock while transaction request T4 has been granted a lock status of Waiting by the lock manager 14. T4 has also been granted the ignore indicator bit by the requestor 16. Subsequently, an overall ignore bit is set by the requestor 16 so that new transaction requests which arrive after the ignore bit indicator has been set are notified of the presence of the ignore indicator bit.

Therefore, when a new, or requesting transaction request (T5) arrives and requests a lock status of Have Lock in order to be granted access to the resource 10, the lock manager 14 compares the access mode of T5 with the access modes of the existing transaction requests 12. It is assumed that the AM of T5 is Share1 which is compatible with the access modes of T1, T2 and T3.

With further reference to FIG. 3, after receiving the lock request (step 100), the lock manager 14 checks to determine if the overall ignore bit is set (step 102). Since the overall ignore bit has been set, T5 is granted a bypass indicator from the lock manager 14. A check is then performed to determine if there are any existing transaction requests 12 on the list 4 which have not been checked against T5 (step 106).

Since the requesting transaction request T5 has just arrived, a check is performed with the first existing transaction request T1. After selecting T1 (step 112), the access modes of the T5 and T1 are compared (step 114). Since they are compatible (both AM=Share1), the lock manager 14 checks the list again to determine if there are any further existing transaction requests 12 (step 106).

Since T2 has not been compared with the requesting transaction request T5, T2 is selected (step 112) and a comparison of their access modes is performed (step 114). Since their access modes are compatible (both access modes are of the Share type), the lock manager 14 then checks the list again for any other unchecked existing transaction requests (step 106). T3 is then selected (step 112) and the access modes of T3 and T5 compared (step 114).

Since the access modes are the same (AM=Share1), the lock manager 14 returns to check the list 4 for more existing transaction requests (step 106). T4 is then selected (step 112) and the access mode of the existing transaction request T4 is then checked against the access mode of the requesting transaction request T5 (step 114).

Since there exists a conflict between the two access modes, a check is performed to determine if T5 is of the type which requires sole, or exclusive, access to the resource (step 116). Since T5 does not require sole access (AM=Share1), a check is performed to determine if the existing transaction request T4 is of the type which requires sole access to the resource (step 122).

Since T4 is of this type (AM=Exclusive), the lock manager 14 notes this and returns to determine if there are any more unchecked existing transaction requests 12. Since there are no more existing transaction requests to be checked against, the lock status of the requesting transaction request T5 is set to Have Lock by the lock manager 14 and the device 2 associated with T5 is granted access the resource 10.

It will be understood that although the transactions corresponding to the transaction request may complete during the comparison stage, for explanation purposes, it is assumed that none of the existing transaction requests 12 finish executing during the comparison process.

If another new or requesting transaction request T6 (with an access mode of ExclusivelyShare1 that conflicts with T2 and T4) arrives and request the lock from the lock manager, the same process as previously disclosed is repeated. After receiving the lock request (step 100), the check to verify that the overall ignore bit is set is performed (step 102).

After setting the bypass indicator for T6 (step 104), the lock manager 14 checks the list 4 for existing transaction requests (step 106) and selects T1 for comparison with T6 (step 112). Since the access modes do not conflict (step 114), the lock manager 14 goes back to the list and checks for further existing transaction request to be compared with T6 (step 106).

After selecting T2 (step 112), the access modes are compared (step 114) and since the two access modes are not compatible, a check is performed to determine if the requesting transaction request T6 is of the type that requires sole access to the resource. Since T6 is of the type that requires sole access to the resource (AM=ExclusivelyShare1), a check is performed to determine whether or not its bypass indicator is set (step 117). Since the bypass indicator is set, the lock status of the requesting transaction request T6, is set to Waiting (step 120) and the transactions request T6 waits until its lock status is changed to Have Lock.

FIG. 4 shows the list 4 associated with the resource 10 at a later stage. It will be assumed that the devices 2 associated with T1 and T2 have finished accessing the resource and have already been removed. T3 has just finished accessing the resource while T5 is presently accessing the resource (lock status equals Have Lock). T4 and T6 both have lock statuses of Waiting.

Since T3 has finished accessing the resource, a remove request is received by the lock manager 14 from the device 2 associated with T3 (step 200). A check is then performed to determine if there are any existing transaction requests with a lock status of Waiting in the list (step 202). Since T4 is the first one in the list, it is selected (step 206).

A check is then performed to determine if there are any existing transaction requests with a lock status of Have Lock (step 208). Since T5 has a lock status of Have Lock, its access mode is compared against the access mode of T4 to determine if they are compatible (step 212). Since a conflict exists, a check is performed to determine if the ignore indicator bit of T4 has been set (step 214). Since it has, a check is performed to determine if the bypass indicator bit for T5 has been set (step 218).

After verifying that the bypass indicator bit has been set, a check is performed to verify whether or not there are other existing transaction requests with lock status of Have Lock to be checked. Since T5 is the only existing transaction request with this lock status, the lock status of T4 is changed from Waiting to Have Lock and all the bits associated with T4, T5 and T6, along with the overall ignore bit, are cleared (step 210). After T5 has finished accessing the resource, T4 may access the resource 10.

The lock manager 14 then searches the list to check if there are any more existing transaction requests with the lock status of Waiting (step 202). T6 is then selected (step 206) and a check is performed to determine if there are any existing transaction requests with a lock status of Have Lock (step 208). Since T4 has just been granted the lock status of Have Lock, it is selected, and a comparison of the access mode of T4 and T6 is performed (step 212).

Since the access modes conflict, a check is performed to determine if T6 has its ignore bit indicator set (step 214). Since it does not, a check is performed to determine if the overall ignore bit indicator is set (step 215). Since it was previously cleared at step 210, the requestor 16 sets the ignore bit indicator for T6 along with the overall ignore bit (step 216). The lock manager 14 then checks if any more existing transaction requests with a lock status of Waiting are on the list. Since there are no more, the lock manager 14 exits the list (step 204) and simply awaits the next transaction request (FIG. 2) or remove request (FIG. 3).

In other embodiments, there is provided a computer program product for use in a computer system operatively coupled to a computer readable memory, the computer program product including a computer-readable data storage medium tangibly embodying computer readable code comprising instructions for directing said computer system to implement apparatus and/or methods discussed above.

Although the invention has been described with reference to certain specific embodiments, various modifications thereof will be apparent to those skilled in the art without departing from the spirit and scope of the invention.

What is claimed is:

1. A method of handling a lock request from a requesting transaction request (transaction B) for additional access to a resource, comprising:
   receiving a lock request for the additional access to the resource from the requesting transaction request (transaction B);
   determining if a conflict exists between an access mode of the requesting transaction request (transaction B) and an access mode of all prior transaction requests (transaction A) with current access to the resource;
   wherein if the conflict exists, determining if the requesting transaction request (transaction B) has been refused and is currently waiting for access to the resource;
   wherein if the requesting transaction request (transaction B) is not waiting for access to the resource and is having current access to the resource, substantially concurrently with the prior transaction requests (transaction A), assigning an ignore indicator to the requesting transaction request (transaction B); and
   wherein the ignore indicator allows a subsequent transaction request (transaction C), with an access mode that conflicts with the requesting transaction (transaction B), to be granted access to the resource, substantially concurrently with the prior transaction requests (transaction A) and the requesting transaction request (transaction B), if an access mode of the subsequent transaction requests (transaction C) does not conflict with the access mode of the prior transaction request (transition A), bypassing the conflicting requesting transaction request (transaction B).

2. The method of claim 1, further comprising setting an overall ignore bit if the ignore indicator is assigned to the requesting transaction request.

3. The method of claim 1, further comprising granting a bypass indicator to the subsequent transaction request.

4. The method of claim 3, further comprising:
monitoring the prior transaction requests to determine when a prior transaction request has been assigned the bypass indicator; and
granting the requesting transaction request access to the resource.

5. The method of claim 4, further comprising clearing the bypass indicator and the ignore indicator.

6. An apparatus for handling a lock request from a requesting transaction request (transaction B) for additional access to a resource, the apparatus comprising:
a lock manager for receiving the lock request for the additional access to the resource from the requesting transaction request (transaction B), and that compares an access mode of the requesting transaction request (transaction B) with an access mode of prior transaction requests (transaction A);
the requester further determining if a conflict exists between the access mode of the requesting transaction request (transaction B) and the access mode of the prior transaction requests (transaction A) with current access to the resource;
wherein if the conflict exists, the requester determining if the requesting transaction request (transaction B) has been refused and is currently waiting for access to the resource;
wherein if the requesting transaction request (transaction B) is not waiting for access to the resource and is having current access to the resource, substantially concurrently with the prior transaction requests (transaction A), the requester assigning an ignore indicator to the requesting transaction request (transaction B); and
wherein the ignore indicator allows a subsequent transaction request (transaction C), with an access mode that conflicts with the requesting transaction (transaction B), to be granted access to the resource, substantially concurrently with the prior transaction requests (transaction A) and the requesting transaction request (transaction B), if an access mode of the subsequent transaction requests (transaction C) does not conflict with the access mode of the prior transaction request (transaction A), bypassing the conflicting requesting transaction request (transaction B).

7. The apparatus of claim 6, wherein the requester further sets an overall ignore indicator if the ignore indicator is granted.

8. The apparatus of claim 7, wherein the lock manager assigns a bypass indicator to the subsequent transaction request.

9. The apparatus of claim 8, wherein when a prior transaction request is assigned the bypass indicator, the lock manager grants access to the resource for the requesting transaction request.

10. A computer program product having instruction codes for handling a lock request from a requesting transaction request (transaction B) for additional access to a resource comprising:
a first set of instruction codes for receiving a lock request for the additional access to the resource from the requesting transaction request (transaction B);
a second set of instruction codes for determining if a conflict exists between an access mode of the requesting transaction request (transaction B) and an access mode of all prior transaction requests (transaction A) with current access to the resource;
wherein if the conflict exists, the second set of instruction codes determines if the requesting transaction request (transaction B) has been refused and is currently waiting for access to the resource;
wherein if the requesting transaction request (transaction B) is not waiting for access to the resource and is having current access to the resource, substantially concurrently with the prior transaction requests (transaction A), the second set of instruction codes assigns an ignore indicator to the requesting transaction request (transaction B); and
wherein the ignore indicator allows a subsequent transaction request (transaction C), with an access mode that conflicts with the requesting transaction (transaction B), to be granted access to the resource, substantially concurrently with the prior transaction requests (transaction A) and the requesting transaction request (transaction B), if an access mode of the subsequent transaction request (transaction C) does not conflict with the access mode of the prior transaction requests (transaction A), bypassing the conflicting requesting transaction request (transaction B).

11. The computer program product of claim 10, further comprising a third set of instruction codes for setting an overall ignore bit if the ignore indicator is assigned to the requesting transaction request.

12. The computer program product of claim 10, further comprising a third set of instruction codes for granting a bypass indicator to the subsequent transaction request.

13. The computer program product of claim 12, further comprising a fourth set of instruction codes for monitoring a prior transaction request to determine when the prior transaction request has been assigned the bypass indicator and for granting the requesting transaction request access to the resource.

14. The computer program product of claim 13, further comprising a fifth set of instruction codes for clearing the bypass indicator and the ignore indicator.

15. A system for handling a lock request from a requesting transaction request (transaction B) for additional access to a resource, comprising:
means for receiving a lock request for the additional access to the resource from the requesting transaction request (transaction B);
means for determining if a conflict exists between an access mode of the requesting transaction request (transaction B) and an access mode of all prior transaction requests (transaction A) with current access to the resource;
means for determining if the requesting transaction requests (transaction B) has been refused and is currently waiting for access to the resource;
means for assigning an ignore indicator to the requesting transaction request (transaction B), if the requesting transaction requests (transaction B) is not waiting for access to the resource and is having current access to the resource, substantially concurrently with the prior transaction requests (transaction A); and
wherein the ignore indicator allows a subsequent transaction request (transaction C), with an access mode that conflicts with the requesting transaction (transaction B), to be granted access to the resource, substantially concurrently with the prior transaction requests (transaction A) and the requesting transaction request (transaction B), if an access mode of the subsequent transaction request (transaction C) does not conflict with the access mode of the prior transaction requests (transaction A), bypassing the conflicting requesting transaction request (transaction B).

16. The system of claim 15, further comprising means for setting an overall ignore bit if the ignore indicator is assigned to the requesting transaction request.

17. The system of claim 15, further comprising means for granting a bypass indicator to the subsequent transaction request.

18. The system of claim 17, further comprising means for monitoring a prior transaction request to determine when the prior transaction request has been assigned the bypass indicator and for granting the requesting transaction request access to the resource.

19. The system of claim 18, further comprising means for clearing the bypass indicator and the ignore indicator.

* * * * *